United States Patent
Komiyama et al.

(10) Patent No.: US 9,116,345 B2
(45) Date of Patent: Aug. 25, 2015

(54) LENS UNIT AND MANUFACTURING METHOD THEREFOR

(71) Applicant: Nidec Sankyo Corporation, Nagano (JP)

(72) Inventors: Tadashi Komiyama, Nagano (JP); Toshio Shirotori, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/067,674

(22) Filed: Oct. 30, 2013

(65) Prior Publication Data

US 2014/0118852 A1    May 1, 2014

(30) Foreign Application Priority Data

Oct. 30, 2012 (JP) .................................. 2012-239512

(51) Int. Cl.
*G02B 7/02* (2006.01)
*G02B 9/34* (2006.01)
*G02B 27/02* (2006.01)

(52) U.S. Cl.
CPC ............... *G02B 27/021* (2013.01); *G02B 9/34* (2013.01); *G02B 27/025* (2013.01)

(58) Field of Classification Search
CPC .......... G02B 9/34; G02B 7/021; G02B 7/025; Y10T 29/49826
See application file for complete search history.

(56) References Cited

U.S. PATENT DOCUMENTS

| 6,865,034 | B1 * | 3/2005 | Willis ........................... 359/820 |
| 7,929,223 | B2 * | 4/2011 | Shimizu et al. ............... 359/811 |
| 8,248,722 | B2 * | 8/2012 | Hattori .......................... 359/827 |
| 8,283,621 | B2 * | 10/2012 | Tatsuzawa et al. ............. 250/216 |
| 8,427,766 | B2 * | 4/2013 | Ning et al. ..................... 359/811 |
| 2014/0118845 | A1 * | 5/2014 | Komiyama ................... 359/713 |

FOREIGN PATENT DOCUMENTS

JP    2006-284620 A    10/2006
JP    2009-063877 A    3/2009

* cited by examiner

*Primary Examiner* — David N Spector
(74) *Attorney, Agent, or Firm* — Cantor Colburn LLP

(57) ABSTRACT

A lens unit may include at least four lens groups and a tube-shaped holder holding the lens groups. The tube-shaped holder is provided with a second lens group holding part provided with a protruded part surrounding an outer peripheral end part of the second lens group through a gap space and the protruded part is provided with a caulked part which is deformed so as to cover the outer peripheral end part from the object side. The protruded part may be provided with a thick portion and a thin portion extended to the front side from the thick portion and the thin portion is caulked by being plastically deformed to be the caulked part. After the second lens group is mounted on an inner side to the protruded part, the position of the second lens group is adjusted and then a caulked part is formed.

24 Claims, 2 Drawing Sheets

LENS UNIT AND MANUFACTURING METHOD THEREFOR

CROSS REFERENCE TO RELATED APPLICATION

The present invention claims priority under 35 U.S.C. §119 to Japanese Application No. 2012-239512 filed Oct. 30, 2012, the entire content of which is incorporated herein by reference.

FIELD OF THE INVENTION

At least an embodiment of the present invention may relate to a lens unit in which at least four lens groups is held by a holder and to a manufacturing method for the lens unit.

BACKGROUND

A lens having been recently used for monitoring or for an on-vehicle application requires a wide angle and a high resolution. In order to constitute such a wide-angle lens, the magnification chromatic aberration is required to be corrected for attaining a high resolution and thus requirements for both of a high resolution and a wide angle are attained by combining four or more lens groups (see Japanese Patent Laid-Open No. 2006-284620 and Japanese Patent Laid-Open No. 2009-63877).

A wide-angle lens as described above is mounted on a device as a lens unit which is held by a tube-shaped holder. In this case, the lens groups are press-fitted into the holder and the lens groups are positioned in two directions ("X" direction intersecting an optical axis direction and "Y" direction intersecting the optical axis direction and the "X" direction). However, according to the conventional structure, positioning accuracy may be easily lowered due to dimensional variation of an inner diameter of the holder, dimensional variation of an outer peripheral end part of a lens and the like. As a result, deviation of the resolution in the "X" direction and the "Y" direction may be easily occurred.

SUMMARY

In view of the problem described above, at least an embodiment of the present invention may advantageously provide a lens unit in which an optical axis is capable of being adjusted surely in a structure that at least four lens groups are held by a tube-shaped holder, and provide a manufacturing method for the lens unit.

According to at least an embodiment of the present invention, there may be provided a lens unit including at least four lens groups and a tube-shaped holder which holds the lens groups. The tube-shaped holder is provided with a second lens group holding part which holds a second lens group located at a second position from an object side and the second lens group holding part is provided with a protruded part which surrounds an outer peripheral end part through a gap space between the outer peripheral end part of the second lens group and the protruded part in a first direction intersecting an optical axis direction and in a second direction intersecting the optical axis direction and the first direction. The protruded part is provided with a caulked part which is deformed so as to cover the outer peripheral end part from the object side.

In at least an embodiment of the present invention, the second lens group holding part which holds a second lens group located at a second position from an object side is provided with a protruded part which surrounds an outer peripheral end part of the second lens group through a gap space between the outer peripheral end part and the protruded part in a first direction and a second direction. The protruded part is provided with a caulked part which is deformed so as to cover the outer peripheral end part of the second lens group from the object side. Therefore, even when there are dimensional variations or the like in the second lens group holding part and the outer peripheral end part of the second lens group, the position of the second lens group can be adjusted in the first direction and the second direction after the second lens group is disposed on the inner side of the protruded part. Accordingly, the optical axis can be adjusted surely and thus deviation of the resolution can be reduced. Further, even when a gap space is provided between the outer peripheral end part of the second lens group and the protruded part, the protruded part is caulked. Therefore, even when there are dimensional variations or the like in the second lens group holding part and the outer peripheral end part of the second lens group, the second lens group can be held appropriately on an inner side of the second lens group holding part. Further, if the optical axis is adjusted by moving a lens group on a rear side in an optical axis direction (opposite side to an object side) with respect to the second lens group, the sensitivity is extremely high and thus positional adjustment with a high degree of accuracy is required. However, according to the embodiment of the present invention, since the second lens group is adjusted, the sensitivity is not extremely high and thus adjustment can be performed relatively easily.

In at least an embodiment of the present invention, the second lens group holding part and the second lens group are fixed to each other with an adhesive. According to this structure, position of the second lens group having been adjusted is fixed surely.

In at least an embodiment of the present invention, for example, it may be structured that the lens groups located at a third or succeeding position from the object side includes a cemented lens constituted of glass lenses and a cemented lens constituted of plastic lenses.

In at least an embodiment of the present invention, a viewing angle is 170° or more.

In at least an embodiment of the present invention, the protruded part is provided at plural positions in a circumferential direction. According to this structure, each of the plural protruded parts is caulked and thus caulking is easily performed.

In at least an embodiment of the present invention, the tube-shaped holder is provided with a bottom plate part located at the most rear side in the optical axis direction, a tube-shaped body part extended from an outer circumferential end of the bottom plate part to a front side which is the object side, a ring-shaped flange part which is enlarged from the tube-shaped body part to an outer side in a radial direction, and a large diameter tube part which is provided with a larger diameter than the tube-shaped body part and is extended to the front side from the flange part, and the protruded part of the second lens group holding part is formed so as to protrude to the front side from an inner side of the flange part. In this case, it is preferable that the protruded part is provided with a thick portion protruded to the front side from the flange part and a thin portion extended to the front side from the thick portion, an inner face of the thick portion and an inner face of the thin portion form a continuous surface and are formed to be concentric shape with the outer peripheral end part of the second lens group, and the thin portion is caulked to be the caulked part. When the thin portion of the protruded part is heated and melted to be plastically deformed, a caulked part which covers the outer peripheral end part of the second lens group on a front side is formed easily.

In at least an embodiment of the present invention, the tube-shaped holder holds, in order from an object side, a first lens group having negative power, the second lens group having negative power, a third lens group having positive power, and a fourth lens group having positive power, and the first lens group is positioned and fixed to the large diameter tube part, and the third lens group and the fourth lens group are positioned and held by the tube-shaped body part.

Further, according to at least an embodiment of the present invention, there may be provided a manufacturing method for a lens unit including at least four lens groups and a tube-shaped holder which holds the lens groups. The manufacturing method includes previously providing in the tube-shaped holder with a second lens group holding part for holding a second lens group located at a second position from an object side, and previously providing in the second lens group holding part with a protruded part for surrounding an outer peripheral end part of the second lens group through a gap space between the outer peripheral end part and the protruded part in a first direction intersecting an optical axis direction and in a second direction intersecting the optical axis direction and the first direction. The manufacturing method further includes mounting the second lens group on an inner side with respect to the protruded part and, after mounting the second lens group, adjusting position of the second lens group in the first direction and the second direction and, after adjusting the position, forming a caulked part which covers the outer peripheral end part on the object side by plastically deforming the protruded part.

In at least an embodiment of the present invention, the second lens group holding part which holds a second lens group located at a second position from an object side is provided with a protruded part for surrounding an outer peripheral end part through a gap space between the outer peripheral end part of the second lens group and the protruded part in the first direction and the second direction. The protruded part is provided with a caulked part which is deformed so as to cover the outer peripheral end part of the second lens group from the object side. Therefore, even when there are dimensional variations or the like in the second lens group holding part and the outer peripheral end part of the second lens group, the position of the second lens group can be adjusted in the first direction and the second direction after the second lens group is disposed on the inner side of the protruded part. Accordingly, the optical axis can be adjusted surely and thus deviation of the resolution can be reduced. Further, even when a gap space is provided between the outer peripheral end part of the second lens group and the protruded part, the protruded part is caulked. Therefore, even when there are dimensional variations or the like in the second lens group holding part and the outer peripheral end part of the second lens group, the second lens group can be held appropriately on an inner side of the second lens group holding part. Further, if the optical axis is adjusted by moving a lens group on a rear side in an optical axis direction (opposite side to an object side) with respect to the second lens group, the sensitivity is extremely high and thus positional adjustment with a high degree of accuracy is required. However, according to the embodiment of the present invention, since the second lens group is adjusted, the sensitivity is not extremely high and thus adjustment can be performed relatively easily.

In this case, it is preferable that the manufacturing method further includes fixing the second lens group to the second lens group holding part with an adhesive after forming the caulked part.

Further, according to at least an embodiment of the present invention, there may be provided a manufacturing method for a lens unit including at least four lens groups and a tube-shaped holder holding the lens groups. The manufacturing method includes previously providing in the tube-shaped holder with a second lens group holding part for holding a second lens group located at a second position from an object side, previously providing in the second lens group holding part with a protruded part for surrounding an outer peripheral end part of the second lens group through a gap space between the outer peripheral end part and the protruded part in a first direction intersecting an optical axis direction and in a second direction intersecting the optical axis direction and the first direction, mounting the second lens group on an inner side with respect to the protruded part and, after mounting the second lens group, forming a caulked part which covers the outer peripheral end part on the object side by plastically deforming the protruded part so that the second lens group is capable of being adjusted on an inner side of the protruded part and, after forming the caulked part, adjusting position of the second lens group in the first direction and the second direction.

In at least an embodiment of the present invention, the second lens group holding part which holds a second lens group located at a second position from an object side is provided with a protruded part for surrounding an outer peripheral end part of the second lens group through a gap space between the outer peripheral end part and the protruded part in the first direction and the second direction. The protruded part is provided with a caulked part which is deformed so as to cover the outer peripheral end part from the object side. Therefore, even when there are dimensional variations or the like in the second lens group holding part and the outer peripheral end part of the second lens group, the position of the second lens group can be adjusted in the first direction and the second direction after the second lens group is disposed on the inner side of the protruded part. Accordingly, the optical axis can be adjusted surely and thus deviation of the resolution can be reduced. Further, even when a gap space is provided between the outer peripheral end part of the second lens group and the protruded part, the protruded part is caulked. Therefore, even when there are dimensional variations or the like in the second lens group holding part and the outer peripheral end part of the second lens group, the second lens group can be held appropriately on an inner side of the second lens group holding part. Further, if the optical axis is adjusted by moving a lens group on a rear side in the optical axis direction (opposite side to an object side) with respect to the second lens group, the sensitivity is extremely high and thus positional adjustment with a high degree of accuracy is required. However, according to the embodiment of the present invention, since the second lens group is adjusted, the sensitivity is not extremely high and thus adjustment can be performed relatively easily.

In this case, it is preferable that the manufacturing method further includes fixing the second lens group to the second lens group holding part with an adhesive after adjusting the position of the second lens group.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A lens unit and its manufacturing method in accordance with an embodiment of the present invention will be described below with reference to the accompanying drawings. In the following description, the unit is "mm" unless there is a specific indication.

(Constitution of Lens Unit)

Figure 1A:
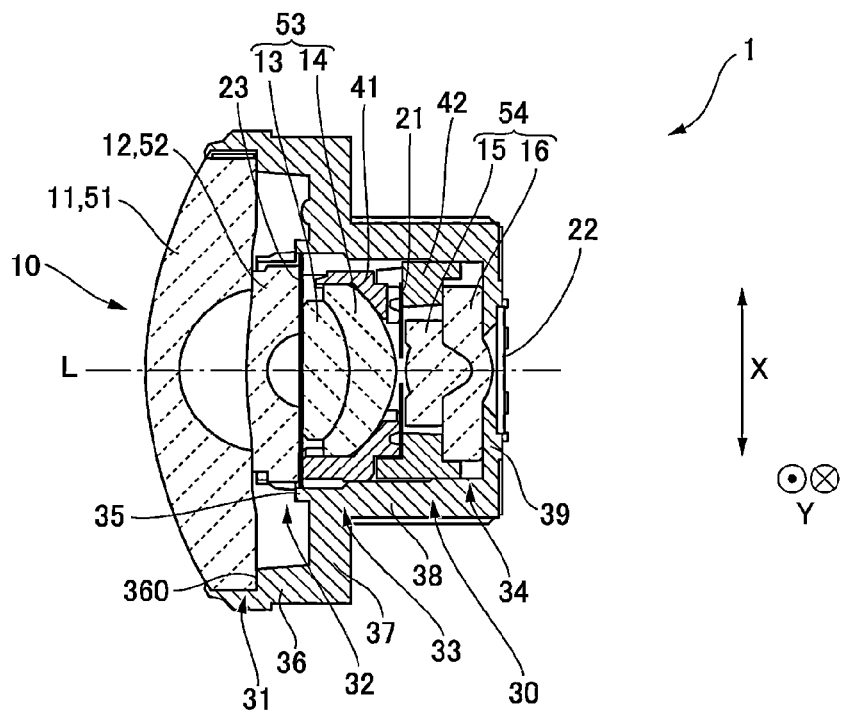
FIGS. 1(a) and 1(b) are explanatory views showing a lens unit in accordance with an embodiment of the present invention.
Figure 1B:
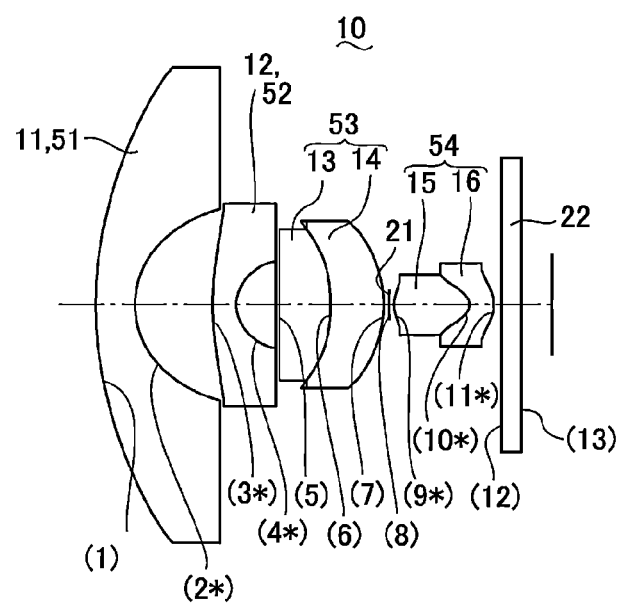

FIGS. 1(a) and 1(b) are explanatory views showing a lens unit in accordance with an embodiment of the present invention. FIG. 1(a) is a cross-sectional view showing a lens unit and FIG. 1(b) is an explanatory view for surface numbers. In FIG. 1(b), the mark "*" added after the surface number indicates that the face with "*" is an aspherical surface.

As shown in FIGS. 1(a) and 1(b), a lens unit 1 in this embodiment includes a wide-angle lens 10 constituted of four or more lens groups and a holder 30 made of resin such as polycarbonate. In this embodiment, the wide-angle lens 10 is constituted of four lens groups. More specifically, the wide-angle lens 10 includes, in order from an object side (object to be photographed side/front side), a first lens group 51 having negative power, a second lens group 52 having negative power, a third lens group 53 having positive power, and a fourth lens group 54 having positive power. A diaphragm 21 is provided between the third lens group 53 and the fourth lens group 54. Further, an infrared filter 22 is provided on a rear side (image side/side opposite to an object to be photographed side) with respect to the fourth lens group 54. Further, a shading sheet 23 is disposed between the second lens group 52 and the third lens group 53.

In this embodiment, the wide-angle lens 10 has totaled six lenses. More specifically, the first lens group 51 is made of a meniscus single lens 11 having negative power and the second lens group 52 is made of a meniscus single lens 12 having negative power. The third lens group 53 is constituted of a cemented lens made of a lens 13 having positive power and a lens 14 having positive power, and the fourth lens group 14 is constituted of a cemented lens made of a lens 15 having positive power and a lens 16 having negative power. In this embodiment, the lenses 13 and 14 are a glass lens and the third lens group 53 is a cemented lens made of glass lenses. Further, the lenses 15 and 16 are a plastic lens and the fourth lens group 54 is a cemented lens made of plastic lenses.

Respective lens data and aspherical surface coefficients of the wide-angle lens 10 having the above-mentioned constitution are shown in Table 1 and Table 2 and totaled six faces, i.e., the second face (2), the third face (3), the fourth face (4), the ninth face (9), the tenth face (10) and the eleventh face (11) are an aspherical surface. Aspherical surface coefficients shown in Table 2 correspond to respective coefficients "A", "B", "C" and "D" in the following aspherical surface function:

$$X=(1/R)Y^2/[1+\sqrt{\{1-(K+1)(1/R)^2 Y^2\}}]+AY^4+BY^6+CY^8+DY^{10}$$

TABLE 1

| Surface Number | Radius | Thickness | Refractive Index Nd | Abbe Number ν d | |
|---|---|---|---|---|---|
| (1) | 14.7 | 1.30 | 1.53157 | 55.7 | |
| (2*) | 3.1 | 2.54 | | | |
| (3*) | 15.8 | 0.80 | 1.53157 | 55.7 | |
| (4*) | 1.265 | 1.40 | | | |
| (5) | −105 | 1.75 | 1.84666 | 23.8 | |
| (6) | −4.5 | 1.75 | 1.72916 | 54.7 | |
| (7) | −4 | 0.15 | | | |
| (8(stop)) | Infinity | 0.20 | | | Diaphram |
| (9*) | 2.462 | 2.50 | 1.53157 | 55.7 | |
| (10*) | −0.563 | 0.80 | 1.63281 | 23.4 | |
| (11*) | −1.5495 | 0.25 | | | |
| (12) | Infinity | 0.70 | 1.51680 | 64.2 | |
| (13) | Infinity | 0.9207 | | | |

TABLE 2

| Surface Number | K | A | B | C | D |
|---|---|---|---|---|---|
| (2*) | −1.100E−01 | 0 | 0 | 0 | 0 |
| (3*) | 2.000E+00 | 1.000E−03 | −1.220E−04 | −3.000E−07 | 0 |
| (4*) | −6.080E−01 | 2.650E−02 | −9.770E−03 | 7.870E−03 | 1.800E−04 |
| (9*) | 2.360E+00 | −1.150E−02 | −5.600E−03 | −3.960E−03 | 8.337E−01 |
| (10*) | −7.750E−01 | 2.340E−01 | 2.840E−01 | 2.300E−01 | −1.000E−01 |
| (11*) | −1.080E+00 | 9.700E−03 | 2.255E−02 | 1.580E−04 | −5.000E−05 |

A viewing angle of the wide-angle lens 10 constituted as described above is 190°, in other words, the viewing angle is 170° or more. Further, in this embodiment, the fourth lens group 54 is a cemented lens constituted of plastic lenses having aspherical surfaces and thus the magnification chromatic aberration can be reduced efficiently. Further, the third lens group 53 is a cemented lens constituted of glass lenses and thus the temperature characteristics are satisfactory.

(Constitution of Holder 1)

In order to structure the lens unit 1 by using the wide-angle lens 10 (lens groups) constituted as described above, the wide-angle lens 10 is held by a tube-shaped holder 30. In this embodiment, the holder 30 is made of resin and includes a bottom plate part 39 located at the most rear side in an optical axis "L" direction, a tube-shaped body part 38 extended to a front side (object side) from an outer circumferential edge of the bottom plate part 39, a ring-shaped flange part 37 enlarged to an outer side in a radial direction from a front end of the tube-shaped body part 38, and a large diameter tube part 36 having a larger diameter than the tube-shaped body part 38 and extended to a front side (object side) from an outer circumferential end of the flange part 37.

An infrared filter 22 is held on a rear end face of the bottom plate part 39 of the holder 30. A rear side portion in an inside of the tube-shaped body part 38 of the holder 30 is formed to be a fourth lens group holding part 34 which holds the fourth lens group 54. The fourth lens group 54 is abutted with an inner side face of the bottom plate part 39 in the fourth lens group holding part 34 to be positioned in the optical axis "L" direction. A ring-shaped frame body 42 is disposed on a front side of the fourth lens group 54 and a part of the frame body 42 is interposed between the fourth lens group 54 and the tube-shaped body part 38 and, as a result, positioning of the fourth lens group 54 is performed in an "X" direction and a "Y" direction perpendicular to the "X" direction and positioning of the diaphragm 21 is performed by a front side end face of the frame body 42.

A front side portion of the tube-shaped body part 38 of the holder 30 is formed to be a third lens group holding part 33 which holds the third lens group 53. The third lens group 53 is disposed on the third lens group holding part 33. A ring-shaped frame body 41 is disposed around the third lens group 53 and the frame body 41 is interposed between the third lens group 53 and the tube-shaped body part 38 to perform positioning of the third lens group 53 in the "X" direction and the "Y" direction. Further, the third lens group 53 is positioned in the optical axis "L" direction by abutting the frame body 41 with the diaphragm 21.

A portion on an inner side with respect to the large diameter tube part 36 of the holder 30 which is adjacent to the tube-shaped body part 38 on a front side is formed to be a second lens group holding part 32 which holds the second lens group 52. More specifically, the tube-shaped body part 38 is provided with a tube part 35 in a cylindrical tube shape which is slightly protruded to a front side from an inner circumferential edge of the flange 37 and the second lens group holding part 32 is structured on a front side of the tube part 35. A structure of the second lens group holding part 32 will be described below with reference to FIGS. 2(a) and 2(b).

A step portion 360 is formed on an inner face of the large diameter tube part 36 and a front side to the step portion 360 is formed to be a first lens group holding part 31 which holds the first lens group 51. In the first lens group holding part 31, the first lens group 51 is positioned in the optical axis "L" direction by abutting with the step portion 360. Further, a very small gap space is provided between an inner face of the first lens group holding part 31 and the first lens group 51 and thus the first lens group 51 is positioned in the "X" direction and the "Y" direction in a state that the first lens group 51 is disposed on an inner side of the first lens group holding part 31. In the positioned state as described above, the first lens group 51 is fixed by a method such as adhesion or caulking.

(Structure of Second Lens Group Holding Part 32)

Figure 2A:
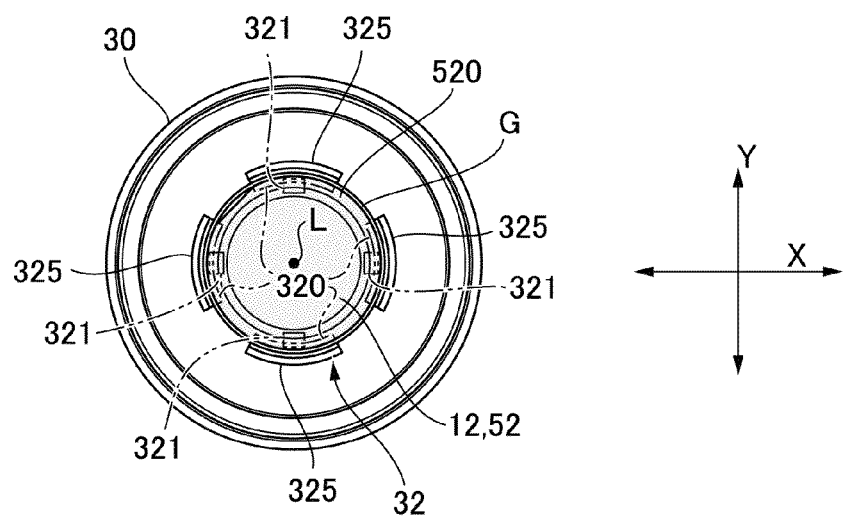
FIGS. 2(a) and 2(b) are explanatory views showing a second lens group holding part of a lens unit in accordance with an embodiment of the present invention.
Figure 2B:
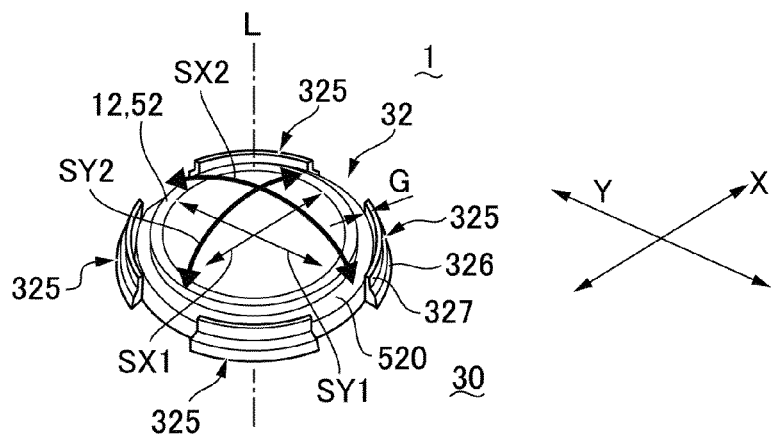

FIGS. 2(a) and 2(b) are explanatory views showing a second lens group holding part 32 of the lens unit 1 in accordance with an embodiment of the present invention. FIG. 2(a) is an explanatory view showing the lens unit 1 which is viewed from a front side (object side/object to be photographed side) in the optical axis direction and FIG. 2(b) is a perspective view showing the second lens group holding part 32 of the holder 30. FIG. 2(a) shows a state before the first lens group 51 is attached and before protruded parts of the second lens group holding part 32 are caulked, for example, by thermal caulking.

As shown in FIGS. 2(a) and 2(b), in the lens unit 1 in this embodiment, the second lens group holding part 32 of the holder 30 is provided with protruded parts 325 extended in a circumferential direction which surround an outer peripheral end part 520 of the second lens group 52 through a gap space "G" between the outer peripheral end part 520 and the protruded parts 325 in the "X" direction and the "Y" direction. In this embodiment, a width dimension of the gap space "G" is two times or more of a dimension of a position adjustable range for the second lens group 52 and, for example, the width dimension of the gap space "G" is 0.05 mm for one protruded part 325. In this embodiment, the protruded parts 325 are formed at plural positions in the circumferential direction. For example, the protruded part 325 is formed at four positions so as to be extended in the circumferential direction with an equal angular interval. The protruded part 325 is protruded to a front side from the tube part 35 shown in FIG. 1(a). Further, the protruded part 325 is provided with a thick portion 326 connected with the tube part 35 and a thin portion 327 extended to a front side from the thick portion 326. The thin portion 327 is protruded to a front side with respect to the outer peripheral end part 520 of the second lens group 52. On the other hand, in the protruded part 325, an inner face of the thick portion 326 and an inner face of the thin portion 327 form a continuous same surface or a continuous one face. Further, the inner face of the thick portion 326 and the inner face of the thin portion 327 are formed in a concentric shape with the second lens group 52, in other words, with the outer peripheral end part 520 of the meniscus single lens 12. According to this structure, the protruded part 325 is provided with the thin portion 327 and thus caulking such as thermal caulking to the protruded part 325 is easily performed. Further, since the protruded part 325 is provided with the thick portion 326, when the thin portion 327 is caulked, a higher strength can be obtained and, even in a case that resin material having low flowability is used for resin-molding the holder 30, the thin portion 327 can be molded in an appropriate shape.

In order to hold the second lens group 52 in the second lens group holding part 32 of the holder 30 structured as described above, in this embodiment, the holder 30 is made of resin and the protruded part 325 is formed with a caulked part 320 (portion shown by the two-dot chain line in FIG. 2(a)) where the thin portion 327 is heated and melted to be plastically deformed so as to cover the outer peripheral end part 520 of the second lens group 52 on a front side. In this embodiment, since the protruded part 325 is formed at four positions in the circumferential direction, the caulked part 320 is formed in each of four protruded parts 325.

Further, the second lens group 52 is fixed to the second lens group holding part 32 by an adhesive 321 as shown by the two-dot chain line in FIG. 2(a). The adhesive 321 is provided so as to extend to the second lens group holding part 32 and the second lens group 52. In this embodiment, the adhesive 321 is provided so as to extend to the caulked part 320 of the second lens group holding part 32 and the outer peripheral end part 520 of the second lens group 52.

(Manufacturing Method for Lens Unit 1)

In a fixing step in which the second lens group 52 is to be fixed to the second lens group holding part 32 in manufacturing steps of the lens unit 1 in this embodiment, as described below, the second lens group 52 is fixed to the second lens group holding part 32 after the position of the second lens group 52 is adjusted.

First, the fourth lens group 54 and the third lens group 53 are mounted on the holder 30 in this order and then, before the first lens group 51 is mounted, in a mounting step, the second lens group 52 is disposed on an inner side with respect to the protruded parts 325.

Next, in an adjusting step, as shown by the arrows "SX1" and "SY1" in FIG. 2(b), positions in the "X" direction and the "Y" direction of the second lens group 52 are adjusted.

Next, in a caulking step, the thin portion 327 of the protruded part 325 is heated and melted to plastically deform so as to cover the outer peripheral end part 520 of the second lens group 52 on a front side to form the caulked part 320. As a result, the second lens group 52 is temporarily fixed by the caulked part 320.

After that, in an adhesion step, an adhesive 321 is applied so as to extend to the second lens group holding part 32 and the second lens group 52 and then the adhesive 321 is cured or rigidified. The adhesive 321 is provided with UV (ultraviolet) curability and humidity curability and thus, ultraviolet rays are irradiated after the adhesive 321 is applied and, after that, the adhesive 321 is cured or rigidified by leaving as it is at a room temperature.

In this embodiment, an adhesion step is performed after a caulking step but, in a case that the second lens group 52 is sufficiently fixed by the caulking step, an adhesion step may be omitted.

(Principal Effects in this Embodiment)

As described above, in the lens unit 1 in accordance with an embodiment of the present invention, the second lens group holding part 32 of the holder 30 for holding the second lens group 52 which is located at a second position from an object side is provided with the protruded parts 325 which surround the outer peripheral end part 520 through a gap space "G" between the outer peripheral end part 520 of the second lens group 52 and the protruded parts 325 in the "X" direction and the "Y" direction. In addition, the protruded part 325 is provided with the caulked part 320 which is deformed so as to cover the outer peripheral end part 520 from the object side. Therefore, even when there are dimensional variations in the second lens group holding part 32 (protruded part 325) and the outer peripheral end part 520 of the second lens group 52, the position of the second lens group 52 can be adjusted in the "X" direction and the "Y" direction after the second lens group 52 is disposed on the inner side of the protruded parts 325. Accordingly, the optical axis "L" of the second lens group 52 can be adjusted surely and thus deviation of the resolution in the "X" direction and the "Y" direction can be reduced. Especially in a case that a viewing angle is 170° or more, deviation of the resolution may be easily occurred in the "X" direction and the "Y" direction. However, according to the embodiment of the present invention, deviation of the resolution is easily and surely reduced.

Further, even when the gap space "G" is provided between the outer peripheral end part 520 of the second lens group 52 and the protruded parts 325, the protruded parts 325 are caulked. Therefore, even when there are dimensional variations in the second lens group holding part 32 and the outer peripheral end part 520 of the second lens group 52, the second lens group 52 can be held appropriately on an inner side of the second lens group holding part 32.

In a case that the optical axis "L" is adjusted by moving a lens group (third lens group 53 or fourth lens group 54) on a rear side (opposite side to an object side) with respect to the second lens group 52 in an optical axis direction, the sensitivity is extremely high and thus positional adjustment with a high degree of accuracy is required. However, according to the embodiment of the present invention, since the second lens group 52 is adjusted, the sensitivity is not extremely high and thus adjustment can be performed relatively easily.

Further, after the caulking step, an adhesion step is performed in which the second lens group holding part 32 and the second lens group 52 are fixed to each other by an adhesive 321 and thus the second lens group 52 is surely fixed to the second lens group holding part 32.

Further, in this embodiment, the protruded part 325 is provided at plural positions in the circumferential direction. Therefore, each of the protruded parts 325 can be caulked and thus caulking is easily performed.

(Another Manufacturing Method)

In the manufacturing method in accordance of the above-mentioned embodiment, the mounting step, the adjusting step, the caulking step and the adhesion step are performed in this order. However, the mounting step, the caulking step, the adjusting step and the adhesion step may be performed in this order. In other words, after the second lens group 52 is disposed on an inner side of the protruded parts 325 in the mounting step, in the caulking step, the thin portions 327 of the protruded parts 325 are heated and melted to be plastically deformed so as to cover the outer peripheral end part 520 of the second lens group 52 on the front side to form the caulked parts 320. In this case, after the caulking step, a gap space "G" is provided between the outer peripheral end part 520 of the second lens group 52 and the protruded parts 325 in the "X" direction and the "Y" direction. Next, in the adjusting step, positions in the "X" direction and the "Y" direction of the second lens group 52 are adjusted as shown by the arrows "SX1" and "SY1" in FIG. 2(b). After that, in the adhesion step, an adhesive 321 is applied so as to extend to the second lens group holding part 32 and the second lens group 52 and then the adhesive 321 is cured.

(Another Positional Adjustment)

In the embodiment described above, in the adjusting step, positions in the "X" direction and the "Y" direction of the second lens group 52 are adjusted as shown by the arrows "SX1" and "SY1" in FIG. 2(b). However, in the adjusting step, as shown by the arrows "SX2" and "SY2" in FIG. 2(b), inclination adjustment of the second lens group 52 around an axial line extending in the "X" direction and inclination of the second lens group 52 around an axial line extending in the "Y" direction may be further adjusted.

(Modified Example of Protruded Part 325)

In the embodiment described above, the protruded part 325 is provided at plural positions in the circumferential direction. However, the protruded part 325 may be formed in a ring shape which is connected in a circumferential direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens unit for use with an object to be photographed, comprising:
   a first lens group;
   a second lens group
   a third lens group;
   a fourth lens group; and
   a tube-shaped holder which holds the first lens group, the second lens group, the third lens group, the and fourth lens group;
   wherein the first lens group, the second lens group, the third lens group, and the fourth lens group are arranged in sequential order from an object side closest to the object to be photographed;
   wherein the tube-shaped holder is provided with a second lens group holding part which holds a second lens group located at a second position from the object side;

wherein the second lens group holding part is provided with a protruded part which surrounds an outer peripheral end part of the second lens group through a gap space between the outer peripheral end part of the second lens group and the protruded part in a first direction intersecting an optical axis direction and in a second direction intersecting the optical axis direction and the first direction; and wherein the protruded part is provided with a caulked part which is deformed so as to cover the outer peripheral end part from the object side.

2. The lens unit according to claim 1, wherein the protruded part is provided at plural positions in a circumferential direction.

3. The lens unit according to claim 1, wherein the second lens group holding part and the second lens group are fixed to each other with an adhesive.

4. The lens unit according to claim 3, wherein the lens groups located at a third or succeeding position from the object side comprises a cemented lens constituted of glass lenses and a cemented lens constituted of plastic lenses.

5. The lens unit according to claim 4, wherein a viewing angle is 170° or more.

6. The lens unit according to claim 1, wherein the tube-shaped holder is provided with a bottom plate part located at the most rear side in the optical axis direction, a tube-shaped body part extended from an outer circumferential end of the bottom plate part to a front side which is the object side, a ring-shaped flange part which is enlarged from the tube-shaped body part to an outer side in a radial direction, and a large diameter tube part which is provided with a larger diameter than the tube-shaped body part and is extended to the front side from the flange part, and the protruded part of the second lens group holding part is formed so as to protrude to the front side from an inner side of the flange part.

7. The lens unit according to claim 6, wherein the tube-shaped holder holds, in order from an object side, a first lens group having negative power, the second lens group having negative power, a third lens group having positive power, and a fourth lens group having positive power, the first lens group is positioned and fixed to the large diameter tube part, and the third lens group and the fourth lens group are positioned and held by the tube-shaped body part.

8. The lens unit according to claim 6, wherein the protruded part is provided with a thick portion protruded to the front side from the flange part and a thin portion extended to the front side from the thick portion, an inner face of the thick portion and an inner face of the thin portion form a continuous surface and are formed to be concentric shape with the outer peripheral end part of the second lens group, and the thin portion is caulked to be the caulked part.

9. The lens unit according to claim 8, wherein the caulked part is formed to be plastically deformed so as to cover the outer peripheral end part of the second lens group on the front side by heating and melting the thin portion of the protruded part.

10. A manufacturing method for a lens unit including at least four lens groups and a tube-shaped holder holding the lens groups, comprising:

previously providing in the tube-shaped holder with a second lens group holding part for holding a second lens group located at a second position from an object side;

previously providing in the second lens group holding part with a protruded part for surrounding an outer peripheral end part of the second lens group through a gap space between the outer peripheral end part and the protruded part in a first direction intersecting an optical axis direction and in a second direction intersecting the optical axis direction and the first direction;

mounting the second lens group on an inner side with respect to the protruded part;

after mounting the second lens group, adjusting position of the second lens group in the first direction and the second direction, and after adjusting the position, forming a caulked part which covers the outer peripheral end part on the object side by plastically deforming the protruded part.

11. The manufacturing method for a lens unit according to claim 10, further comprising fixing the second lens group to the second lens group holding part with an adhesive after forming the caulked part.

12. The manufacturing method for a lens unit according to claim 10, wherein the lens groups located at a third or succeeding position from the object side comprises a cemented lens constituted of glass lenses and a cemented lens constituted of plastic lenses.

13. The manufacturing method for a lens unit according to claim 10, wherein a viewing angle is 170° or more.

14. The manufacturing method for a lens unit according to claim 10, wherein the protruded part is provided at plural positions in a circumferential direction.

15. The manufacturing method for a lens unit according to claim 10, wherein the tube-shaped holder is provided with a bottom plate part located at the most rear side in the optical axis direction, a tube-shaped body part extended from an outer circumferential end of the bottom plate part to a front side which is the object side, a ring-shaped flange part which is enlarged from the tube-shaped body part to an outer side in a radial direction, and a large diameter tube part which is provided with a larger diameter than the tube-shaped body part and is extended to the front side from the flange part, and the protruded part of the second lens group holding part is formed so as to protrude to the front side from an inner side of the flange part.

16. The manufacturing method for a lens unit according to claim 15, wherein the protruded part is provided with a thick portion protruded to the front side from the flange part and a thin portion extended to the front side from the thick portion, an inner face of the thick portion and an inner face of the thin portion form a continuous surface and are formed to be concentric shape with the outer peripheral end part of the second lens group, and the thin portion is caulked to be the caulked part.

17. The manufacturing method for a lens unit according to claim 16, wherein the caulked part is formed to be plastically deformed so as to cover the outer peripheral end part of the second lens group on the front side by heating and melting the thin portion of the protruded part.

18. A manufacturing method for a lens unit including at least four lens groups and a tube-shaped holder holding the lens groups, comprising:

previously providing in the tube-shaped holder with a second lens group holding part for holding a second lens group located at a second position from an object side;

previously providing in the second lens group holding part with a protruded part for surrounding an outer peripheral end part of the second lens group through a gap space between the outer peripheral end part and the protruded part in a first direction intersecting an optical axis direction and in a second direction intersecting the optical axis direction and the first direction;

mounting the second lens group on an inner side with respect to the protruded part;

after mounting the second lens group, forming a caulked part which covers the outer peripheral end part on the object side by plastically deforming the protruded part so that the second lens group is capable of being adjusted on the inner side of the protruded part;

after forming the caulked part, adjusting position of the second lens group in the first direction and the second direction.

19. The manufacturing method for a lens unit according to claim 18, further comprising fixing the second lens group to the second lens group holding part with an adhesive after adjusting the position of the second lens group.

20. The manufacturing method for a lens unit according to claim 18, wherein the lens groups located at a third or succeeding position from the object side comprises a cemented lens constituted of glass lenses and a cemented lens constituted of plastic lenses.

21. The manufacturing method for a lens unit according to claim 18, wherein a viewing angle is 170° or more.

22. The manufacturing method for a lens unit according to claim 18, wherein the protruded part is provided at plural positions in a circumferential direction.

23. The manufacturing method for a lens unit according to claim 18, wherein the tube-shaped holder is provided with a bottom plate part located at the most rear side in the optical axis direction, a tube-shaped body part extended from an outer circumferential end of the bottom plate part to a front side which is the object side, a ring-shaped flange part which is enlarged from the tube-shaped body part to an outer side in a radial direction, and a large diameter tube part which is provided with a larger diameter than the tube-shaped body part and is extended to the front side from the flange part, and the protruded part of the second lens group holding part is formed so as to protrude to the front side from an inner side of the flange part.

24. The manufacturing method for a lens unit according to claim 23, wherein the protruded part is provided with a thick portion protruded to the front side from the flange part and a thin portion extended to the front side from the thick portion, an inner face of the thick portion and an inner face of the thin portion form a continuous surface and are formed to be concentric shape with the outer peripheral end part of the second lens group, and the thin portion is caulked to be the caulked part.

* * * * *